(12) United States Patent
Yavuz et al.

(10) Patent No.: US 9,521,585 B2
(45) Date of Patent: Dec. 13, 2016

(54) METHOD AND APPARATUS FOR DYNAMIC ADJUSTMENT OF UPLINK TRANSMISSION TIME

(71) Applicant: QUALCOMM Incorporated, San Diego, CA (US)

(72) Inventors: Mehmet Yavuz, San Diego, CA (US); Bibhu P Mohanty, San Diego, CA (US); Ozcan Ozturk, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 14/324,335

(22) Filed: Jul. 7, 2014

(65) Prior Publication Data

US 2014/0321286 A1    Oct. 30, 2014

Related U.S. Application Data

(62) Division of application No. 12/104,795, filed on Apr. 17, 2008, now Pat. No. 8,811,335.

(Continued)

(51) Int. Cl.
*H04W 28/12* (2009.01)
*H04L 1/00* (2006.01)
(Continued)

(52) U.S. Cl.
CPC ............ *H04W 28/12* (2013.01); *H04L 1/0007* (2013.01); *H04W 28/06* (2013.01); *H04W 48/16* (2013.01);
(Continued)

(58) Field of Classification Search
None
See application file for complete search history.

(56) References Cited

U.S. PATENT DOCUMENTS

| | | | |
|---|---|---|---|
| 6,813,284 B2 | 11/2004 | Vayanos et al. | |
| 7,218,949 B2 * | 5/2007 | Koo | H04W 52/12 370/329 |

(Continued)

FOREIGN PATENT DOCUMENTS

| | | |
|---|---|---|
| EP | 1748593 A1 | 1/2007 |
| JP | 2007082192 A | 3/2007 |

(Continued)

OTHER PUBLICATIONS

International Search Report—PCT/US2008/060880, International Searching Authority—European Patent Office—Aug. 12, 2008.

(Continued)

*Primary Examiner* — Jung-Jen Liu
(74) *Attorney, Agent, or Firm* — François A. Pelaez

(57) ABSTRACT

Systems and methods for dynamically adjusting the transmission time interval (TTI) for a communications system are presented. The described aspects provide for dynamically adjusting the TTI in a communication session between a base station or nodeB and a wireless device or user equipment between a shorter TTI, which can provide increased data throughput and lower power consumption, and a longer TTI, which can provide more rugged communication link connections. By dynamically adjusting the TTI, the communications link can be optimized for the given communication channel conditions. Determinations, based on indicia related to the communications system conditions, can be employed in dynamic TTI adjustment. These determinations can be formed centrally at the Radio Network Controller (RNC), at the RNC supplemented with user equipment (UE)

(Continued)

available information, or formed in a distributed manner between the RNC and UE across a communications system.

22 Claims, 12 Drawing Sheets

Related U.S. Application Data

(60) Provisional application No. 60/913,262, filed on Apr. 20, 2007.

(51) Int. Cl.
*H04W 28/06* (2009.01)
*H04W 48/16* (2009.01)
*H04W 52/36* (2009.01)
*H04W 88/12* (2009.01)
*H04W 52/02* (2009.01)

(52) U.S. Cl.
CPC ..... *H04W 52/0216* (2013.01); *H04W 52/0229* (2013.01); *H04W 52/367* (2013.01); *H04W 88/12* (2013.01); *Y02B 60/50* (2013.01)

(56) References Cited

U.S. PATENT DOCUMENTS

| | | | |
|---|---|---|---|
| 7,233,577 B2* | 6/2007 | Choi | H04W 52/143 370/252 |
| 7,242,953 B2* | 7/2007 | Al-Housami | H04W 48/14 370/252 |
| 7,330,482 B2* | 2/2008 | Boumendil | H03M 13/2796 370/458 |
| 7,453,862 B2* | 11/2008 | Adjakple | H04L 1/20 370/333 |
| 7,515,579 B2 | 4/2009 | Cheng et al. | |
| 7,768,953 B2* | 8/2010 | Terry | H04B 7/2618 370/252 |
| 7,796,505 B2* | 9/2010 | Olsson | H04L 1/1854 370/229 |
| 7,869,405 B2* | 1/2011 | Rune | H04W 36/18 370/206 |
| 7,881,257 B2* | 2/2011 | Fauconnier | H04L 1/0048 370/329 |
| 7,894,444 B2* | 2/2011 | Lohr | H04B 7/2612 370/278 |
| 7,899,075 B2* | 3/2011 | Whitehead | H04L 1/1887 370/310 |
| 8,811,335 B2 | 8/2014 | Yavuz et al. | |
| 2003/0036403 A1* | 2/2003 | Shiu | H04W 52/12 455/522 |
| 2003/0185159 A1* | 10/2003 | Seo | H04L 1/0026 370/278 |
| 2004/0058699 A1 | 3/2004 | Jonsson et al. | |
| 2004/0120288 A1* | 6/2004 | Adjakple | H04L 1/20 370/333 |
| 2005/0073985 A1* | 4/2005 | Heo | H04B 7/2628 370/342 |
| 2005/0176435 A1* | 8/2005 | Fauconnier | H04L 1/0048 455/450 |
| 2005/0201337 A1* | 9/2005 | Heo | H04L 1/1845 370/335 |
| 2006/0034285 A1 | 2/2006 | Pirskanen et al. | |
| 2006/0057978 A1 | 3/2006 | Love et al. | |
| 2006/0067324 A1* | 3/2006 | Kim | H04W 76/022 370/395.2 |
| 2006/0217141 A1 | 9/2006 | Legg et al. | |
| 2007/0013985 A1 | 1/2007 | Chuang et al. | |
| 2007/0047485 A1 | 3/2007 | Gorokhov et al. | |
| 2007/0201404 A1* | 8/2007 | Cheon | H04L 12/5693 370/331 |
| 2007/0245216 A1* | 10/2007 | Kim | H03M 13/09 714/758 |
| 2008/0008127 A1 | 1/2008 | Choi et al. | |
| 2008/0063150 A1 | 3/2008 | Kanaan et al. | |
| 2009/0034474 A1* | 2/2009 | Yavuz | H04L 1/0007 370/331 |
| 2009/0219886 A1* | 9/2009 | Rune | H04W 36/18 370/331 |
| 2009/0268707 A1* | 10/2009 | Pani | H04L 1/18 370/345 |
| 2010/0165901 A1* | 7/2010 | Kim | H04W 72/005 370/312 |
| 2010/0232297 A1 | 9/2010 | Johansson et al. | |
| 2014/0321440 A1 | 10/2014 | Yavuz et al. | |

FOREIGN PATENT DOCUMENTS

| | | |
|---|---|---|
| RU | 2208913 | 7/2003 |
| RU | 2005122724 A | 1/2007 |
| WO | 0158054 A1 | 8/2001 |
| WO | 02065675 | 8/2002 |
| WO | 2007025160 | 3/2007 |

OTHER PUBLICATIONS

Taiwan Search Report—TW097114414—TIPO—Mar. 15, 2012.
Written Opinion—PCT/US2008/060880, International Searching Authority—European Patent Office—Aug. 12, 2008.

\* cited by examiner

METHOD AND APPARATUS FOR DYNAMIC ADJUSTMENT OF UPLINK TRANSMISSION TIME

CLAIM OF PRIORITY UNDER 35 U.S.C. §119

The present Application for patent is a divisional of U.S. application Ser. No. 12/104,795, "METHOD AND APPARATUS FOR DYNAMIC ADJUSTMENT OF UPLINK TRANSMISSION TIME" filed Apr. 17, 2008, which claims priority to Provisional Application No. 60/913,262, "Method and Apparatus for Dynamic Adjustment of Uplink Transmission Time" filed Apr. 20, 2007, and assigned to the assignee hereof and hereby expressly incorporated by reference herein.

BACKGROUND

Field

The present invention relates generally to communication, and more specifically to techniques for dynamically adjusting the transmission timing interval (TTI) in a communication system.

Background

Communication systems are widely deployed to provide various communication services such as voice, packet data, and so on. These systems can be multiple-access systems capable of supporting communication with multiple users simultaneously by sharing the available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

A communication system can employ a transmission time interval (TTI) for transmission of data between communication system components (e.g., between user equipment (UE) and a base station (BS or NodeB)). For example, a NodeB may transmit one or more data packets to a receiver in a given TTI, wherein the TTI can be based on the transmission conditions, commonly referred to as the link budget. Generally, the link budget refers to the gains and losses in a signal transmitted between a transmitter and a receiver in a communications system and therefore accounts for attenuated signals, antenna gains, and other gains and losses. For example, the received power is equal to the transmitted power minus losses plus gains for that NodeB. As such, all transmissions within a given NodeB can utilize a common TTI. Under current standards, communications systems can select either a 2 millisecond (ms) or 10 ms TTI. Conventionally, communications systems select either the 2 ms or 10 ms TTI when establishing a communications event (e.g., a voice call, data call, or combinations thereof, . . . ). Further conventional systems typically employ the same TTI for all UE-NodeB pairs in a given communications region (e.g., a cell).

There is therefore a need in the art to be able to dynamically select TTI's within an established communication session and further to be able to individually dynamically select TTI's for a plurality of mobile devices within a transmission region.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The high speed packet access standard allows both 10 millisecond (ms) transmission time interval (TTI) and 2 ms TTI for uplink transmission operations. High speed packet access (HSPA) encompasses high speed downlink packet access (HSDPA) technology and high speed uplink packet access (HSUPA) technology and also includes HSPA+ technology. HSDPA, HSUPA and HSPA+ are part of the Third Generation Partnership Project (3GPP) specifications Release 5, Release 6, and Release 7, respectively, which specifications are expressly incorporated by reference herein. In HSUPA, the 2 ms TTI can provide lower transmission delays and larger hybrid automatic repeat request (HARQ) gains. Moreover, the 2 ms TTI can enable longer battery life in a discontinuous transmission (DTX) mode for mobile device operation. In contrast, the 10 ms TTI can provide better link budgeting (e.g., more robust transmissions) and therefore can be preferred for mobile devices located in regions of a cell with poorer communication linking conditions.

The TTI can be shorter, for example, where transmission conditions are good, and longer, for example, where transmission conditions are poor. Two common TTI's are 2 ms and 10 ms, where, for example, the 2 ms TTI can be employed for transmissions in good conditions (e.g., a UE is close to a BS, there is little interference, . . . ) and, also for example, the 10 ms TTI can be employed where conditions are less optimal (e.g., a UE is located at the NodeB cell edge, there is substantial interference, . . . ). The transmitter can, for example, transmit more information over the same total time by selecting the shorter TTI when the conditions are germane to the use of the shorter TTI (e.g., there will be more 2 ms TTI windows than 10 ms TTI windows in a given total time window, such as, for example 200 ms). A transmitter can also, for example, robustly transmit data (e.g., with a better link budget) in less optimal conditions by selecting a longer TTI window.

Conventional communications systems typically do not dynamically select TTI windows (e.g., conventional systems do not adjust TTI's during an established communication session). Further, conventional communications systems generally do not designate TTIs for each UE-BS pairing (e.g., one-to-one, many-to-one, or one-to-many) within a transmission region (e.g., a cell) or for UE-BS pairings transitioning between transmission regions (e.g., in soft handoff or experiencing soft-handoff conditions). Rather, conventional communications systems generally select a static TTI when establishing a communication session and maintain that selected TTI for the duration of the communication session. This can occur where UE capabilities indicate a preferential TTI. Thus, conventional systems may select a static TTI without deference to actual communications link conditions. Moreover, this static TTI is generally applied to every UE-BS pairing in a given region (e.g., a cell).

Thus, for example all cell phones in a radio area network (RAN) cell would be relegated to the same static TTI rate. This can be detrimental to the overall quality, performance, and efficiency of communications over the link(s) during an established communications session. For example, where a cell phone call is initiated in good conditions, a 2 ms TTI can be selected. As the cell phone user, for example, drives away from the NodeB, the link conditions can worsen, even sufficiently to cause, for example, missed data packets, poor communications quality, or a dropped call, all while continuing to maintain the 2 ms TTI.

As a second example, a cell phone call can be initiated where link conditions are not optimal and a 10 ms TTI can be selected. The transmission conditions over the link can also improve, for example, as weather conditions improve. However, where the TTI in the conventional system has already been selected as 10 ms, the communications link can continue to employ the 10 ms TTI, inefficiently in light of the improved link conditions that could support, for example, a 2 ms TTI (e.g., dynamically switching to a 2 ms TTI could provide higher quality and more efficient communication or data transfer rates).

As a third example, assuming a plurality of cell phones in a radio area network (RAN), where some cell phones are under good conditions and others are under less optimal conditions, all cell phones in a cell can be told to use 10 ms TTI rates (e.g., the worst communications condition is used to set the TTI for all cell phones in the RAN cell). While this can provide robust communications for all UEs in the cell, where some of the UEs could have used shorter TTI, they are not optimized and are performing less efficiently than they could with, for example, a 2 ms TTI.

In contrast to conventional systems that can assign a selected TTI to all UEs in a cell, the disclosed subject matter facilitates dynamically assigning TTI rates to each UE in a cell. By dynamically assigning TTI rates, it is meant that the TTI rate for a communications link can be adjusted within an existing communications event, for example, a cell phone can switch between 2 ms and 10 ms TTIs during a cell phone conversation to maintain the most optimal performance. This can provide for improved communications throughput where conditions permit and more rugged communications where conditions are less optimal. Further, each UE in the cell can be assigned the most appropriate TTI for that UE's specific conditions. Under current HSPA standards, 2 ms and 10 ms TTIs are contemplated and thus, for ease of understanding and clarity, only these two TTI windows will be used for examples within the disclosure. One of skill in the art will appreciate that the disclosed subject matter is not so limited and that any TTI window can be employed. Thus, where standards change and/or the use of alternate TTI windows is desirable, these TTI windows are to be considered within the scope and spirit of the herein disclosed subject matter. Any specific example employing 2 ms and/or 10 ms TTIs is not intended to be limiting and is disclosed only as an example within the current standards.

In one specific embodiment, a radio network controller (RNC) dynamically selects the TTI to be employed for communication with UEs. Selection criteria used by the RNC can include, but are not limited to, the signal to noise ratio of the pilot signal (Ecp/Nt) and/or the packet error rate (PER) of one or more UEs. Thus, for example, where the RNC determines that a UE is currently using a first TTI and the Ecp/Nt has passed a predetermined threshold and/or the PER, over a certain time interval, has transitioned a predetermined limit, then the RNC can facilitate dynamic reconfiguration of the UE to use an alternate TTI that can facilitate a more optimal communications link.

In a second specific embodiment a UE employing a first TTI can indicate communications link indicia (for example, the available transmission (TX) power headroom) to a NodeB (for example, by way of a scheduling information (SI) transmission). The NodeB can relay this information to a RNC to facilitate a RNC determination that the communications link is sub-optimal, for example, that the UE can be TX power headroom limited. Where non-optimal communications conditions exist (e.g., the UE has limited TX power headroom), the RNC can facilitate dynamic reconfiguration of the UE to use an alternate TTI that can facilitate a more optimal communications link.

In a third specific embodiment, a UE employing a first TTI can monitor communications link indicia. These communications link indicia can include, but are not limited to, power headroom limitations, change in TX power headroom over time (e.g., slope), and/or HARQ early termination statistics. The UE can communicate a UE request that the RNC dynamically reconfigure the UE to use an alternate TTI that can facilitate a more optimal communications link. As a non-limiting example, if the available TX power headroom goes below a predetermined threshold, the UE can request to be switched to a 10 ms TTI via a layer 3 message to the RNC.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
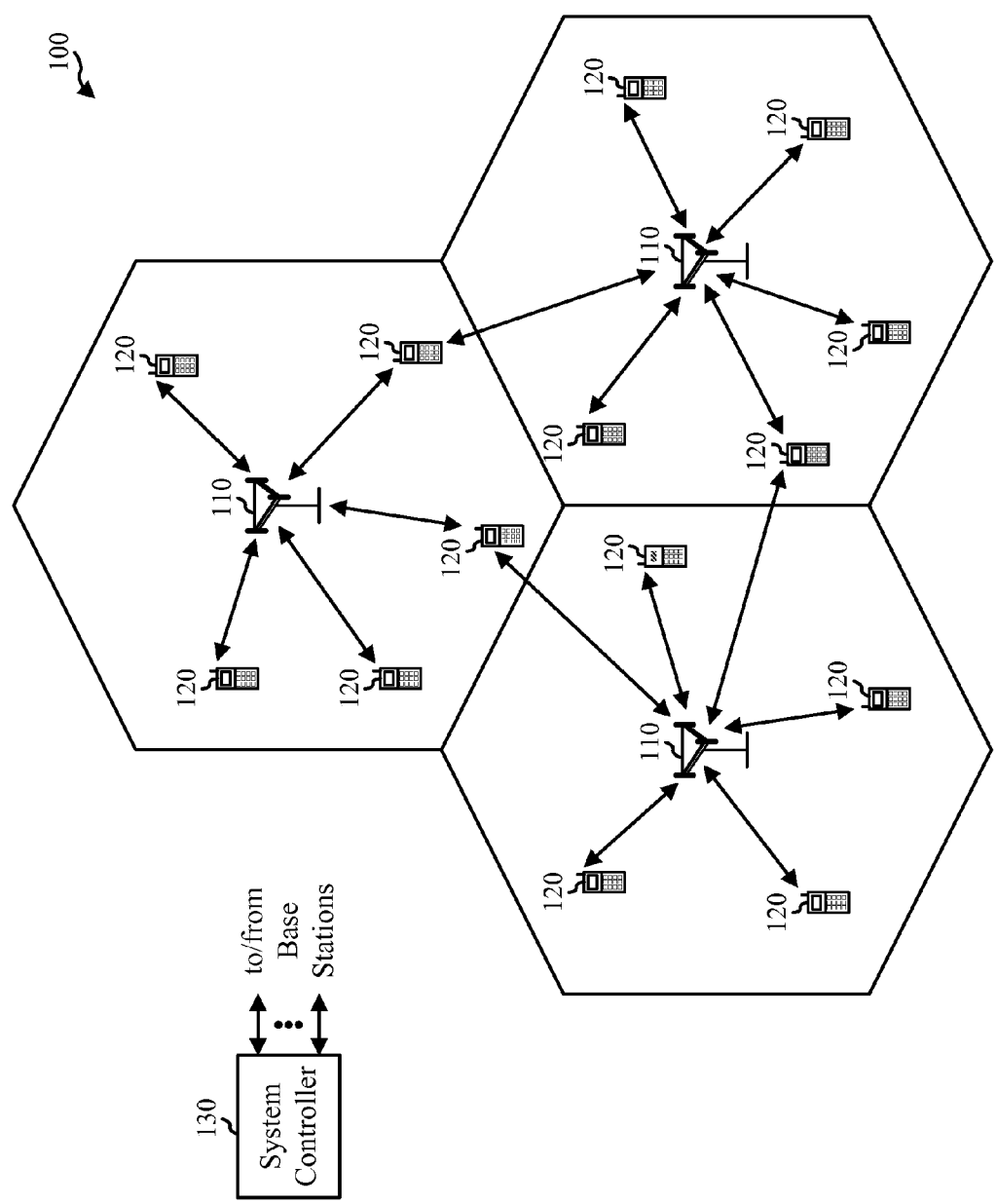
FIG. 1 illustrates a wireless communication system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a NodeB, or some other terminology.

The techniques described herein may be used for various wireless communication systems such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA or SCFDMA) and other systems. The terms "system" and "network" are often used interchangeably. A CDMA system may implement a radio technology such as Universal Terrestrial Radio Access (UTRA), Code Division Multiple Access 2000 (CDMA2000 or cdma2000®), etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20 (Mobile Broadband Wireless Access (MBWA)), Fast Low-latency Access with Seamless Handoff Orthogonal Multiplexing (FOFDM or Flash-OFDM®), etc. UTRA and E-UTRA are part of Universal Mobile Telecommunication System (UMTS). 3rd Generation Partnership Project (3GPP) Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Turning to FIG. 1, illustrated is a wireless communication system 100 with a number of base stations 110 that support communication for a number of wireless terminals 120. A base station is a fixed station used for communicating with the terminals and can also be called an access point, a base transceiver station (BTS), a NodeB, or some other terminology. A terminal may be fixed or mobile and may also be called a mobile station (MS), a mobile equipment (ME), a user equipment (UE), a wireless device, a subscriber unit, or some other terminology. The terminals may be dispersed throughout the system. Each base station may communicate with any number of terminals at any given moment depending on various factors such as, for example, the number of terminals within the coverage (e.g., cell) of the base station, the available system resources, the data requirements of the terminals, and so on. A system controller 130 provides coordination and control for the base stations. The system controller may comprise a radio network controller (RNC) (not illustrated). Transmission protocols between the terminals and base station can include TTI widows as part of the protocol, for example, as described in the 3GPP specification releases 5, 6 and/or 7, among other specifications.

Typically, the 3GPP release 6 (and release 7) standard allows 10 ms transmission time interval (TTI) or 2 ms TTI for uplink operation, as herein described. Generally, the 2 ms TTI provides lower transmission delay, larger HARQ gain, longer UE battery life, or combinations thereof. Further, as disclosed herein, the 10 ms TTI can provide more robust communications over, for example, less optimal communications links and may therefore be preferred for UEs at a cell edge, experiencing soft-handoff conditions, or in soft handoff.

Specifically, the 3GPP release 6 (HSUPA) standard designates an enhanced uplink dedicated channel (EDCH), one or more EDCH dedicated physical channels (EDPDCH) (up to 4 EDPDCH channels currently allowed), and an EDCH dedicated physical control channel (EDPCCH), each of which can communicate information within a single TTI, wherein the TTI can be 2 ms or 10 ms in HSUPA. The EDCH carries a single transport block per TTI. The EDCH is mapped to the one or more (up to 4) EDPDCH. The EDPDCH uplink channels can include a header, a payload, and scheduling information with the TTI. The EDCH is associated with the EDPCCH. The EDPCCH uplink channel can include control information (e.g., a sequence identification number and an indicator of the transport format) and a resource status indicator (e.g., indicates to the NodeB that the UE granted data rate is, or is not, satisfactory). The EDCH can include data in a single transport block set (TBS). Employing these uplink channels (among others), data can be uploaded from the UE to the NodeB in either 2 ms or 10 ms TTIs in compliance with the 3GPP specification (e.g., release 6 and/or 7).

Conventional HSUPA (and HSUPA+) networks typically employ either the 10 ms TTI or 2 ms TTI for a communication link with the UE. The TTI is assigned to UEs by way of a reconfiguration message sent to the UE from a RNC. The RNC can assign a TTI for all UEs in a cell. For example, in large cells which can have link budget problems with a 2 ms TTI, a 10 ms TTI can be assigned to all UE in the cell, which can improve cell performance but also can reduce transmission capacity and battery life. In any given period of time, more short TTI windows can occur than long TTI windows. Thus, short TTIs (e.g., 2 ms TTIs) generally can be employed to carry information more efficiently by sending the information in more individual transport block sets (TBS) per given time period, for example five 2 ms TTI can be sent in the same time as one 10ms TTI. Generally it can be preferential to employ shorter TTI (e.g., 2 ms TTI), where germane to the communications system, over longer TTI (e.g., 10 ms TTI) because of the possibility of improved performance (e.g., transmitting more information in less total time). However, where the communications system cannot support the shorter TTI because of system conditions, (e.g., Ecp/Nt ratio cannot be increased due to limited TX power headspace, the packet error rate (PER) is excessively high for the shorter TTI, . . . ) the longer TTI (e.g., 10 ms TTI) can be preferential.

Figure 2:
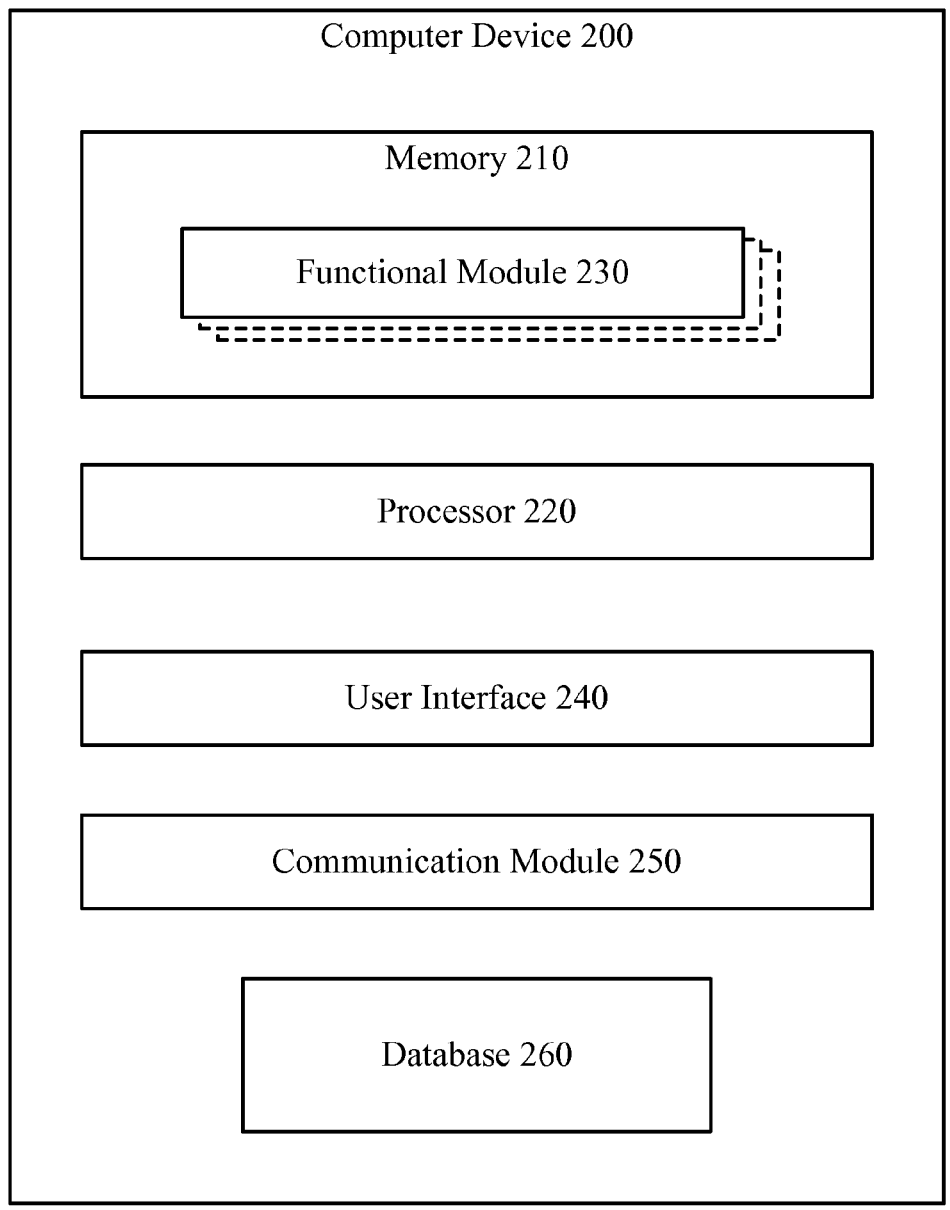
FIG. 2 illustrates a schematic diagram of one aspect of a computer device implementation of one or more of the components of FIG. 1.

Referring to FIG. 2, the components of system 100 (FIG. 1) may be embodied in a computer device 200 that includes a memory 210 in communication with a processor 220. Memory 210 is operable for storing applications for execution by processor 220. Memory 210 can include random access memory (RAM), read only memory (ROM), and a combination thereof. In particular, each component of system 100 (FIG. 1) may include one or more functional modules, applications, or programs 230 operable to perform the component-specific actions described herein. Further, processor 220 is operable for carrying out processing functions associated with one or more of the components described herein. Processor 220 can include a single processor or multiple sets of processors or multi-core processors. Moreover, processor 220 can be implemented as an integrated processing system and/or a distributed processing system.

Additionally, computer device 200 includes user interface 240 operable to receive inputs from a user of a UE 120, and to generate outputs for presentation to the user. User interface 240 can include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface 240 can include one or more output devices, including but not limited to a display, a speaker, a haptic feedback mechanism, a printer, any other mechanism capable of presenting an output to a user, or any combination thereof Further, computer device 200 includes a communications component 250 that provides for establishing and maintaining communications with one or more other components utilizing hardware, software, and services. Communications component 250 can carry communications between components on computer device 200, as well as between computer device 200 and external devices, such as access point system controller 130 or NodeB 110 (FIG. 1), other network-side or infrastructure elements, or other devices serially or locally connected to computer device 200. Communications component 250 includes a receiver to receive communications and a transmitter to transmit communications. Further, communications component 250 includes the corresponding receive chain components and transmit chain components to enable exchanging messages according to one or more respective protocols.

Additionally, computer device 200 can further include database 260, which can be any suitable combination of hardware and/or software, that provides for mass storage of data/information, data relationships, and software programs/applications employed in connection with aspects described herein when not in use in active memory 210. Additionally, database 260 can store one or more functional modules/programs/applications 230 when the respective applications are not in active memory 210.

Figure 3A:
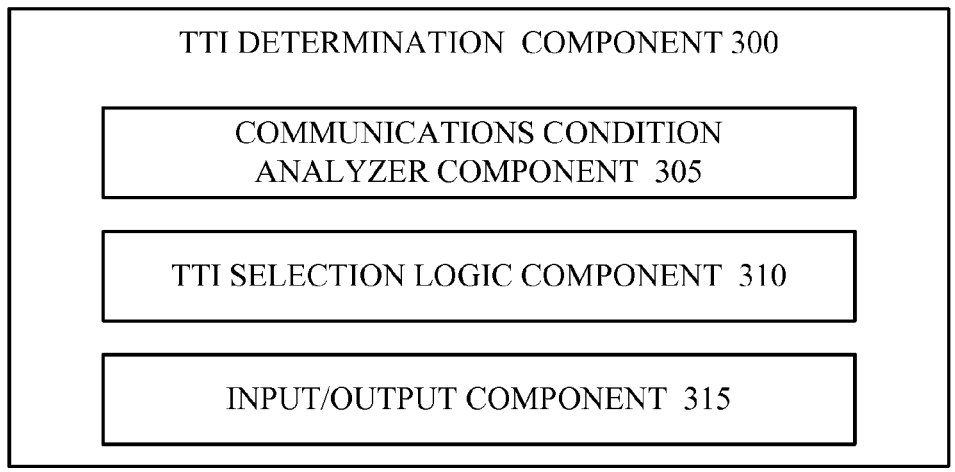
FIGS. 3A-3C illustrate schematic diagrams of functional modules in accordance with aspects of the disclosed subject matter.

Referring to FIG. 3, illustrated are schematic diagrams of functional modules in accordance with aspects of the disclosed subject matter. Specifically with regard to FIG. 3A, depicted is a schematic diagram of a functional module in one embodiment of a dynamic TTI adjustment communications system in accordance with aspects of the disclosed subject matter. In an embodiment, the TTI determination component 300 can be located in an RNC (e.g., in the system controller 130 (see FIG. 1), or in the RNC of FIGS. 7 and 8). In alternative embodiments, the TTI determination component 300 can be located in a NodeB, in other portions of a system controller (e.g., 130 of FIG. 1), or in similar computer implemented portion of a communications system germane to determining an optimal TTI and communicating an instruction to the UE to dynamically adjust the TTI window. The TTI determination component 300 can be a single component or can be formed in a distributed manner. Further, the components of the TTI determination component 300 can be embodied in shared components, for example, the communication module 250 (see FIG. 2) can function as the I/O component 315 of TTI determination component 300. Further, TTI determination component 300 can include a communications condition analyzer component 305 that can analyze the communications condition (e.g., the link budget) of a communications link between, for example, a UE and a NodeB. The analysis can be based on indicia of communications link conditions including, among others, the Packet Error Rate (PER), transmission (TX) power level, and/or the Pilot channel signal to noise ratio (Ecp/Nt).

The communications condition analyzer component 305 can be communicatively coupled to a TTI selection logic component 310. The TTI selection logic component 310 can determine a most optimal TTI window for the communications link between, for example, the UE and NodeB. The determination can be based, at least in part, on the analysis of the communications condition from component 310. Further, the determination can be based on additional factors including, for example, business goals, inferences about future communications system conditions (e.g., determined by an artificial intelligence component (not illustrated)), or a predetermined logic pattern, among other factors related to improving communications system performance by selecting an appropriate TTI.

TTI Determination component 300 can further include an input/output (I/O) component 315. The I/O component 315 can be employed to receive information into, or send information from, the TTI determination component 300. For example, the I/O component 315 can receive indicia related to the communications condition for analysis in the communications condition analyzer component 305. Similarly, for example, the I/O component 315 can communicate the selected TTI from TTI selection logic component 310 to, for example a transmitter (not illustrated) to be sent to a UE.

Figure 3B:
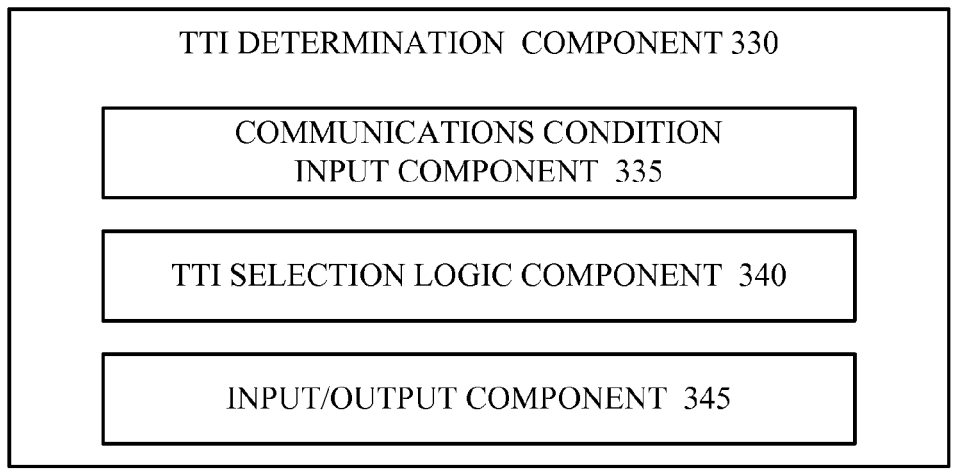

Turning to FIG. 3B, depicted is a schematic diagram of a functional module in one embodiment of a dynamic TTI adjustment communications system in accordance with aspects of the disclosed subject matter. . In an embodiment, the TTI determination component 330 can be located in an RNC (e.g., in the system controller 130 (see FIG. 1), or in the RNC of FIGS. 7 and 8). In alternative embodiments, the TTI determination component 300 can be located in a NodeB, in other portions of a system controller (e.g., 130 of FIG. 1), or in similar computer implemented portion of a communications system germane to determining an optimal TTI and communicating an instruction to the UE to dynamically adjust the TTI window. The TTI determination component 300 can be a single component or can be formed in a distributed manner. Further, the components of the TTI determination component 300 can be embodied in shared components, for example, the communication module 250 (see FIG. 2) can function as the I/O component 315 of TTI determination component 300. TTI determination component 330 can include a communications condition input component 335 that can receive indicia related to an external analysis of a communications condition (e.g., the link budget) of a communications link between, for example, a UE and a NodeB. The external analysis can be based on indicia of communications link conditions including, among others, the Packet Error Rate (PER), TX power level, UE TX power headroom and/or the Pilot channel signal to noise ratio (Ecp/Nt). By receiving an externally analyzed communications condition, this information can be directly acted upon with or without further processing.

The communications condition input component 335 can be communicatively coupled to a TTI selection logic component 340. TTI selection logic component 340 can be the same as, or similar to, TTI selection logic component 310. The TTI selection logic component 340 can determine a most optimal TTI window for the communications link between, for example, the UE and NodeB. The determination can be based, at least in part, on the analysis of the communications condition from component 340. Further, the determination can be based on additional factors including, for example, business goals, inferences about future communications system conditions (e.g., determined by an artificial intelligence component (not illustrated)), or a predetermined logic pattern, among other factors related to improving communications system performance by selecting an appropriate TTI.

TTI Determination component 330 can further include an input/output (I/O) component 345. The I/O component 345 can be employed to receive information into, or send information from, the TTI determination component 330. For example, the I/O component 345 can receive externally analyzed communications condition information and pass this to the communications condition input component 335. Similarly, for example, the I/O component 345 can communicate the selected TTI from TTI selection logic component 340 to, for example a transmitter (not illustrated) to be sent to a UE.

Figure 3C:
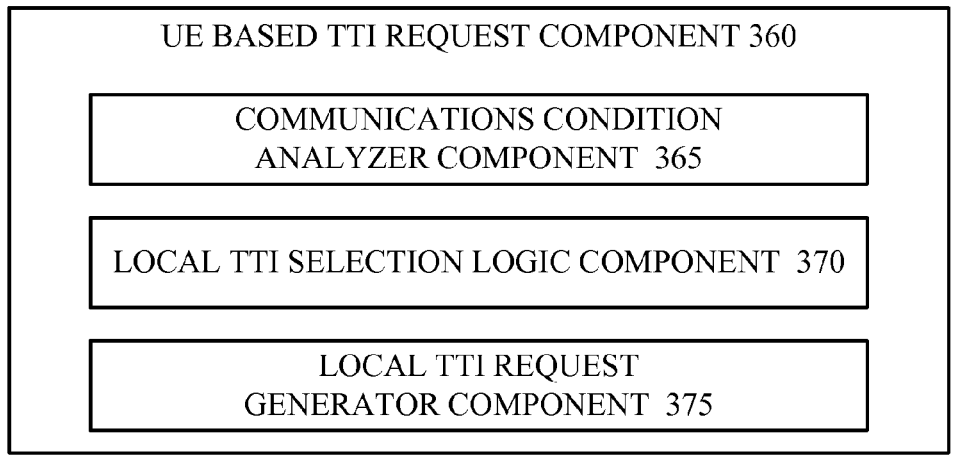

Turning to FIG. 3C, depicted is a schematic diagram of a functional module in one embodiment of a dynamic TTI adjustment communications system in accordance with aspects of the disclosed subject matter. In an embodiment, the UE based TTI request component 360 can be located in a UE (e.g., in a UE 120 (see FIG. 1), in a cell phone, a PDA, a laptop computer, or other UE as herein described). In alternative embodiments, the UE based TTI request component 360 can be located in a NodeB. The UE based TTI request component 360 can be a single component or can be formed in a distributed manner, for example between the UE and a NodeB. Further, the components of the UE based TTI request component 360 can be embodied in shared components, for example, the transmitter/receiver of a UE 120 (see FIG. 1) can function as the local TTI request generator component 375 of the UE based TTI request component 360.

The UE based TTI request component 360 can include a communications condition analyzer component 365 that can be the same as, or similar to, communications condition analyzer component 305. The communications condition analyzer component 365 can analyze the communications condition (e.g., the link budget) of a communications link between, for example, a UE and a NodeB, based at least in part on communications indicia that can be monitored by a UE. The analysis can be based on indicia of communications link conditions including, among others, the TX power headroom, the rate of change over time of the TX power headroom, actual TX power level, and/or the Pilot channel signal to noise ratio (Ecp/Nt).

The communications condition analyzer component 365 can be communicatively coupled to a local TTI selection logic component 370. Local TTI selection logic component 370 can determine a most optimal TTI window for the communications link between, for example, the UE and NodeB. This determination can be based, at least in part, on the analysis of the communications condition from component 365. Thus, the local TTI determination is in general based on an analysis of the communication condition from the UE perspective.

UE based TTI request component 360 can further include a local TTI request generator component 375 (which can be similar to I/O component 315). The local TTI request generator component 375 can be employed to receive information into, or send information from, the UE based TTI request component 360. For example, the local TTI request generator component 375 can receive communications condition information available to the UE and pass this to the communications condition analyzer component 365. Similarly, for example, the local TTI request generator component 375 can communicate the selected local TTI from local TTI selection logic component 370 to, for example a transmitter (not illustrated) to be sent to the RNC.

The local TTI request generator component 375 also specifically can be employed to generate a TTI request that can be communicated to the RNC. The TTI request can be based at least in part on the local TTI selection logic component 370 determination. Thus, where the local communications conditions (e.g., the link budget indicia perceivable by the UE) are analyzed, a local TTI determination based at least in part thereon can be formed. This local TTI determination can then be employed in forming a TTI request that can be sent to, for example, the RNC. The RNC can then make further determinations (not illustrated) relating to fulfilling the local TTI request and can, based on these additional determinations (not illustrated) send instructions to the UE to adjust the TTI based at least in part on the local TTI request.

Figure 4:
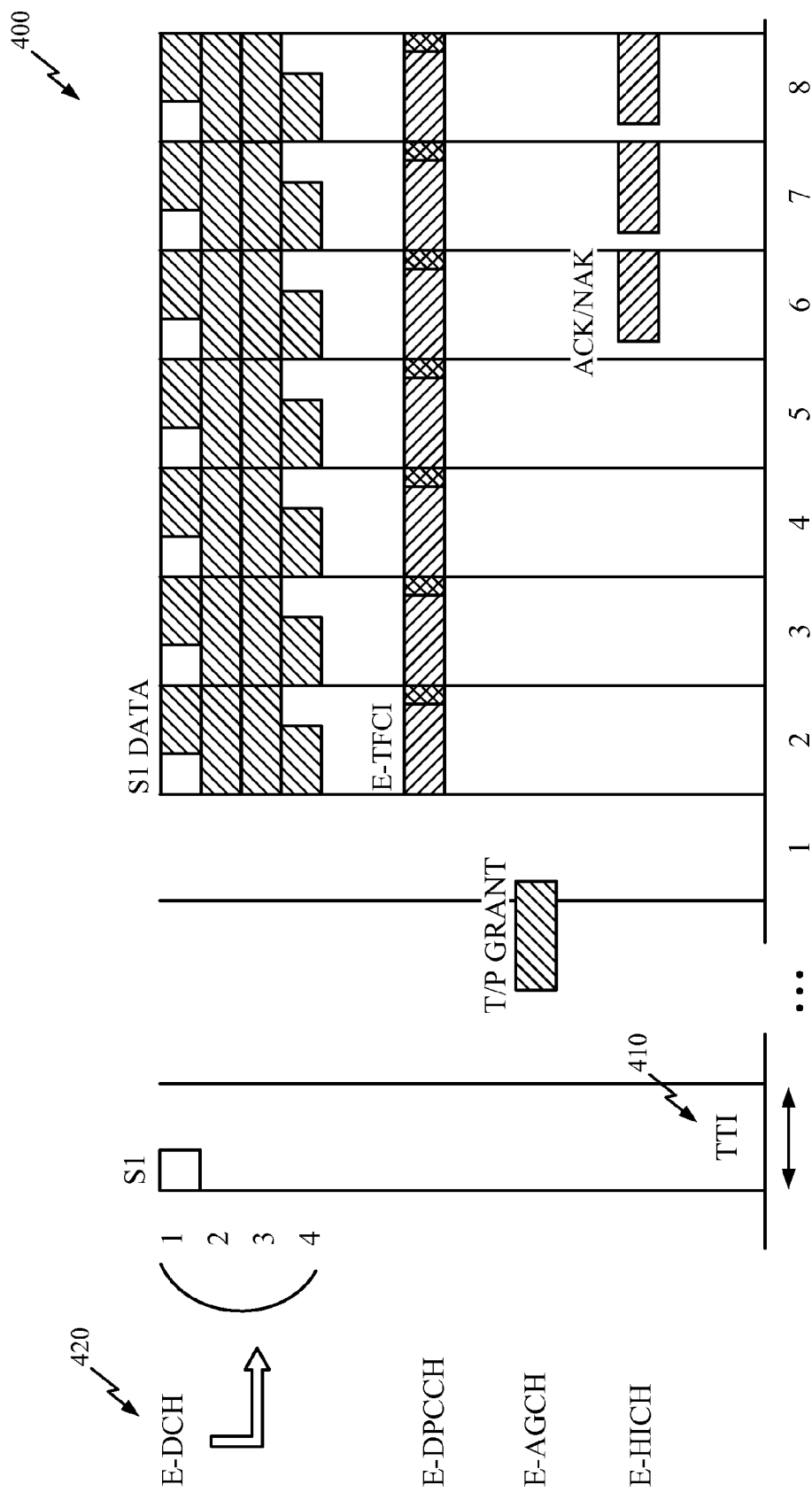
FIG. 4 illustrates a timing diagram for HSUPA compliant multi-code transmission in accordance with an aspect of the disclosed subject matter.

Referring now to FIG. 4, illustrated is a timing diagram 400 for HSUPA transmissions. Information can be transmitted within each TTI 410. As discussed herein, the EDCH 410 can be extended by mapping onto as many as four EDPDCH 420 under current 3GPP specifications (rel. 6). In this example (e.g., in accord with rel. 6 of the 3GPP specification), the TTI can be 2 ms or 10 ms. The 3GPP specification typically can facilitate data rates of several Mbit/s over HSPA (e.g., 3GPP rel. 6) by increasing capacity of existing mobile radio networks. This can be particularly useful for systems requiring high data throughput, for example, voice over internet protocol (VoIP), video conferencing, and mobile office applications. Further improvements are possible under HSPA+ (e.g., 3GPP rel. 7).

In contrast to conventional systems where a static TTI is assigned for a communications session with a UE, in accordance with the disclosed subject matter, a TTI can be dynamically assigned to each UE within a communications system depending on the communication conditions specific to the respective UE. Thus, where communications systems conditions change, the TTI can be changed within the continuing communications session events. For example, a determination can be made based in part on a UE's link budget requirements that a transition from a first TTI to a second TTI can facilitate improved communications system performance. The disclosed subject matter is not limited to selecting between a specific set of TTIs, however, for simplicity and ease of understanding under current communications system industry specifications, the examples and discussion herein are generally described with respect to examples of 2 ms and 10 ms TTIs. It is noted, however, that other temporal windows for TTIs can be employed where they conform to industry or application standards, and that all such TTIs are considered within the scope and spirit of the disclosure.

Figure 5:
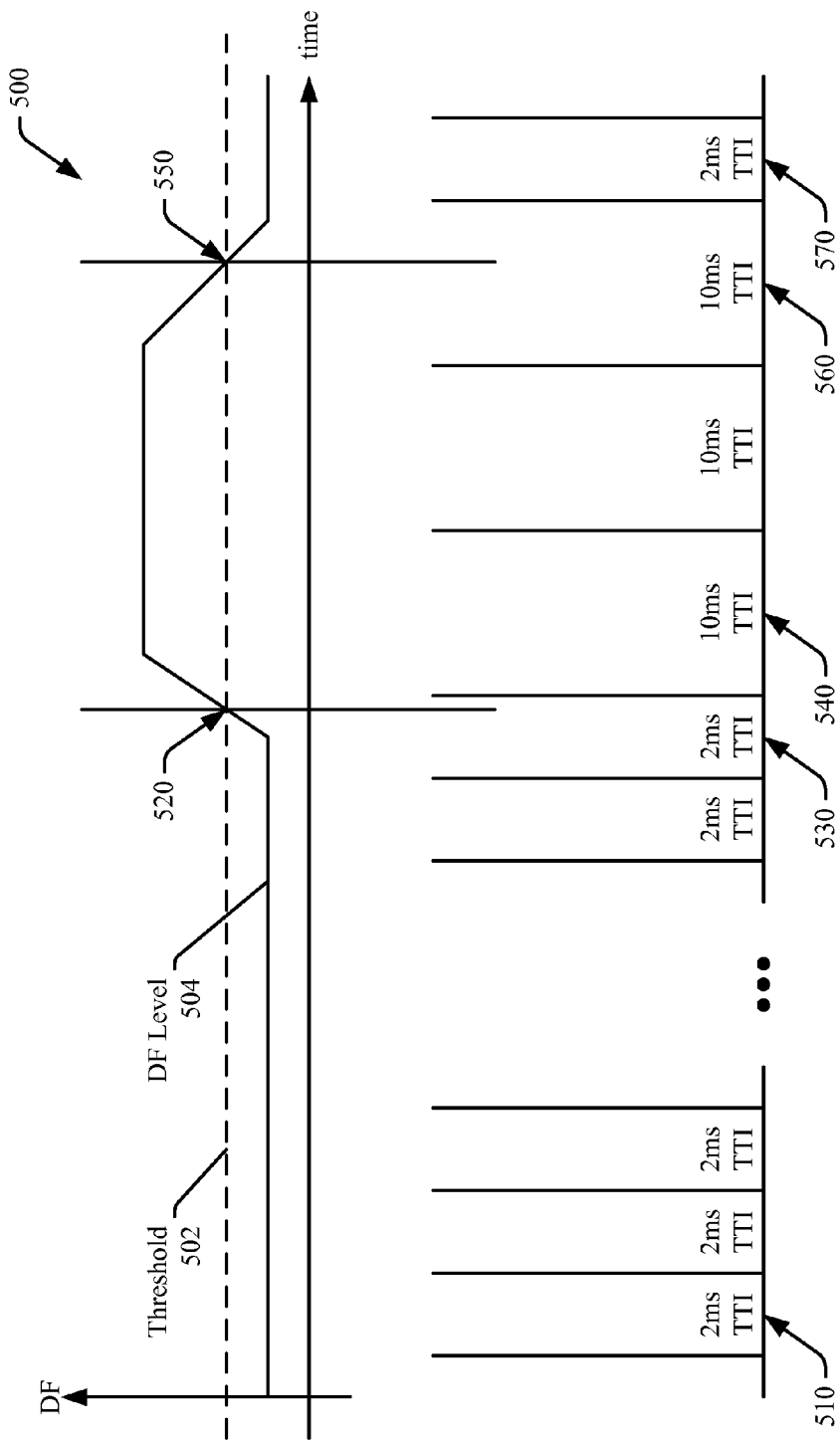
FIG. 5 illustrates a timing diagram for dynamic adjustment of TTI in accordance with an aspect of the disclosed subject matter.

Referring now to FIG. 5, a diagram 500 for dynamic adjustment of TTIs in accordance with the disclosed subject matter is illustrated. A plot of a determining factor (DF) against time is given illustrating a threshold level (Threshold 502) and a determining factor level (DF Level 504) changing with time. Where a communications system can be employing 2 ms TTIs for communicating data at 510, this can continue until the DF Level 504 exceeds the threshold level 502 at 520. Where the DF Level 504 exceeds the Threshold 502 at 520, the communications system (e.g., the RNC) can dynamically adjust the TTI from a 2 ms TTI at 530 to a 10 ms TTI at 540 to facilitate continued communications over the established communications link. For example, a reconfiguration message from the RNC can be transmitted to the UE to instruct the UE to employ the new TTI. Similarly, where the DF Level 504 drops below the Threshold 502 at 550, the communications system can dynamically adjust the TTI from a 10 ms TTI at 560 to a 2 ms TTI at 570 to facilitate continued communications over the established communications link. As stated herein, the disclosed subject matter is not limited to 2 ms and/or 10 ms TTIs and these specific TTI windows are used only as non-limiting examples because they comply with current industry standards (e.g., 3GPP rel. 6 and 7). Where other TTI windows comport with relevant industry or applications standards, these TTI windows are to be considered within the scope of the disclosed subject matter.

As an example based on the transitions illustrated in FIG. 5 (and relevant under current standards as herein disclosed), where a cell phone call begins near a NodeB, the transmission conditions can be sufficiently good (e.g., the conditions are able to sustain a communications link at a predetermined HARQ residual error rate, packet error rate (for example, 0% to 2%, among others), TX power headroom, . . . , or combinations thereof). This will prove very valuable in overcoming possible USPTO Examiner rejections against prior art that may be raised.] to support a 2 ms TTI (e.g., 510) which can be preferred over a longer TTI (for example, the 2 ms TTI can be more efficient than the 10 ms TTI because of higher information throughput, . . . ). Then, as the phone call continues, the cell phone user can enter an elevator where the communications conditions are impaired (e.g., DF Level 504 exceeds Threshold 502 at 520). Where the communications system was using 2 ms TTI windows for data transmission (e.g., 530), the RNC can designate that a 10 ms TTI should be used to maintain the telephone call (e.g., RNC can instruct a transition from 2 ms TTI 530 to 10 ms TTI 540). The longer TTI can be used while the cell phone call continues in the elevator by employing conventional cell phone methods to maintain the best connection with 10 ms TTI windows (e.g., increasing TX power levels to maintain the link where there is interference caused by the elevator shaft, . . . ). While using the longer TTI, the transmissions can be, for example, less efficient (e.g., more power used with higher TX power levels, less information transfer over a given total time interval, . . . ), but this can be preferable to, for example, not being able to close the communications link. The cell phone user can then leave the elevator upon reaching their desired floor, at which time the DF Level 504 can decrease to below the Threshold 502 level (e.g., at 550). In response, the RNC can designate that the efficiency of the communication link can be improved by again transitioning the TTI (e.g., more information transferred in a given total time window, . . . ), this time from a 10 ms TTI (e.g., 560) to a 2 ms TTI (e.g., 570). It is to be appreciated that the disclosed subject matter can facilitate dynamically adjusting between at least two TTIs based at least in part on the communications condition (e.g., link budget) of the respective UE-NodeB pairs.

Figure 6:
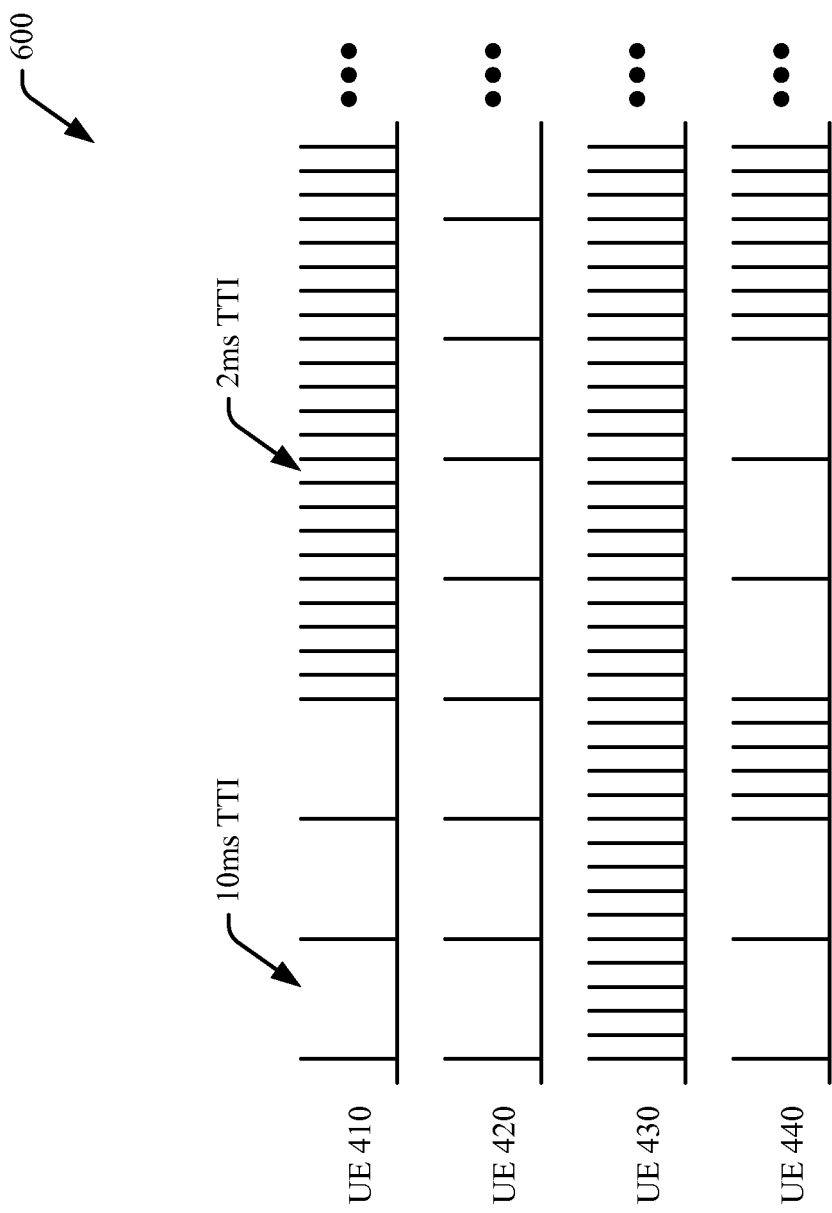
FIG. 6 illustrates comparative timing diagrams for dynamic TTI adjustment in accordance with aspects of the disclosed subject matter.

Referring now to FIG. 6, in another aspect, where a plurality of UEs are present within a communication system 600, each UE can be instructed by the RNC to employ an appropriate TTI for each of the respective communications links. In contrast to conventional systems where a single TTI is generally assigned to all UEs in a cell, based upon the worst communications link conditions, the disclosed subject matter facilitates dynamic TTI transitioning over time for each individual UE in the cell. Thus, a first UE 610 can employ a 10 ms TTI and, over time, transition to a 2 ms TTI based on changing communications conditions specific to first UE 610, while a second UE 620 employs only a 10 ms TTI, a third UE 630 employs only a 2 ms TTI, and a fourth UE 640 employs a 10 ms TTI and transitions to a 2 ms TTI then to a 10 ms TTI and back to a 2 ms TTI. Thus, dynamic adjustment of the TTI can facilitate more optimal and efficient communications systems as compared to relegating all UEs in a cell to the "lowest common denominator" TTI.

In accordance with an aspect of the disclosed subject matter, dynamic adjustment of TTIs can be determined based at least in part on a determining factor (DF) transitioning a threshold level (e.g., 504), as herein disclosed. The DF can be a single indicium, a combination of different indicia, or an inference based at least in part on an indicium. The indicium or indicia are typically related to the communications link conditions, such that the dynamic adjustment of the TTI can facilitate more optimum data communications between a BS and a UE. Thus, while good communication link conditions can allow use of both a 2 ms and 10 ms TTI, the more optimal TTI of the communication link can be the 2 ms TTI where this facilitates faster communication of data between the UE and the BS. However, other factors or indicia can be included in a determination for dynamically adjusting the TTI. For example, where the link conditions are good and both a 2 ms and 10 ms TTI can be employed, the 10 ms TTI can be selected where the data transmission rate is sufficiently low so as not to need the 2 ms TTI.

Similarly, where the link conditions are good enough to support both the 2 ms and 10 ms TTI, the 10 ms TTI can be selected because it is determined that the UE is in soft handoff to another BS where the 10 ms TTI is preferable, or because it is determined that the UE is experiencing soft-handoff conditions wherein the 10 ms TTI would provide a better communication link. In a specific example, the packet error rate (PER) can be employed as a DF such that, for example, as the PER exceeds 1% the RNC can dynamically transition to the 10 ms TTI to facilitate maintaining the communications link without excessive packet errors. As a second specific example, the Pilot channel signal to noise ratio (Ecp/Nt) can be employed as a DF such that, for example, where the Ecp/Nt has reached a threshold through being increased to compensate for increasing error rates, the RNC can dynamically adjust to a 10 ms TTI to allow a lower Ecp/Nt to be employed (e.g., a TX power headroom limited state can be an indicator of a need to dynamically transition between TTIs). Similarly, where PER and/or Ecp/Nt are used as indicia, they can also indicate that a transition to a shorter TTI is appropriate, for example, where the PER is below a threshold (for example below 1%), the RNC can initiate a dynamic transition to a 2 ms TTI to facilitate more efficient data transmissions across the communications link. Where the communication condition (e.g., link budget) can be affected by a nearly limitless number of factors, a similarly large number of other indicia related to the link budget can be employed to facilitate determining when to dynamically adjust the TTI, and all such communication condition indicia (e.g., link budget indicia) are considered within the scope of the disclosed subject matter.

Figure 7:
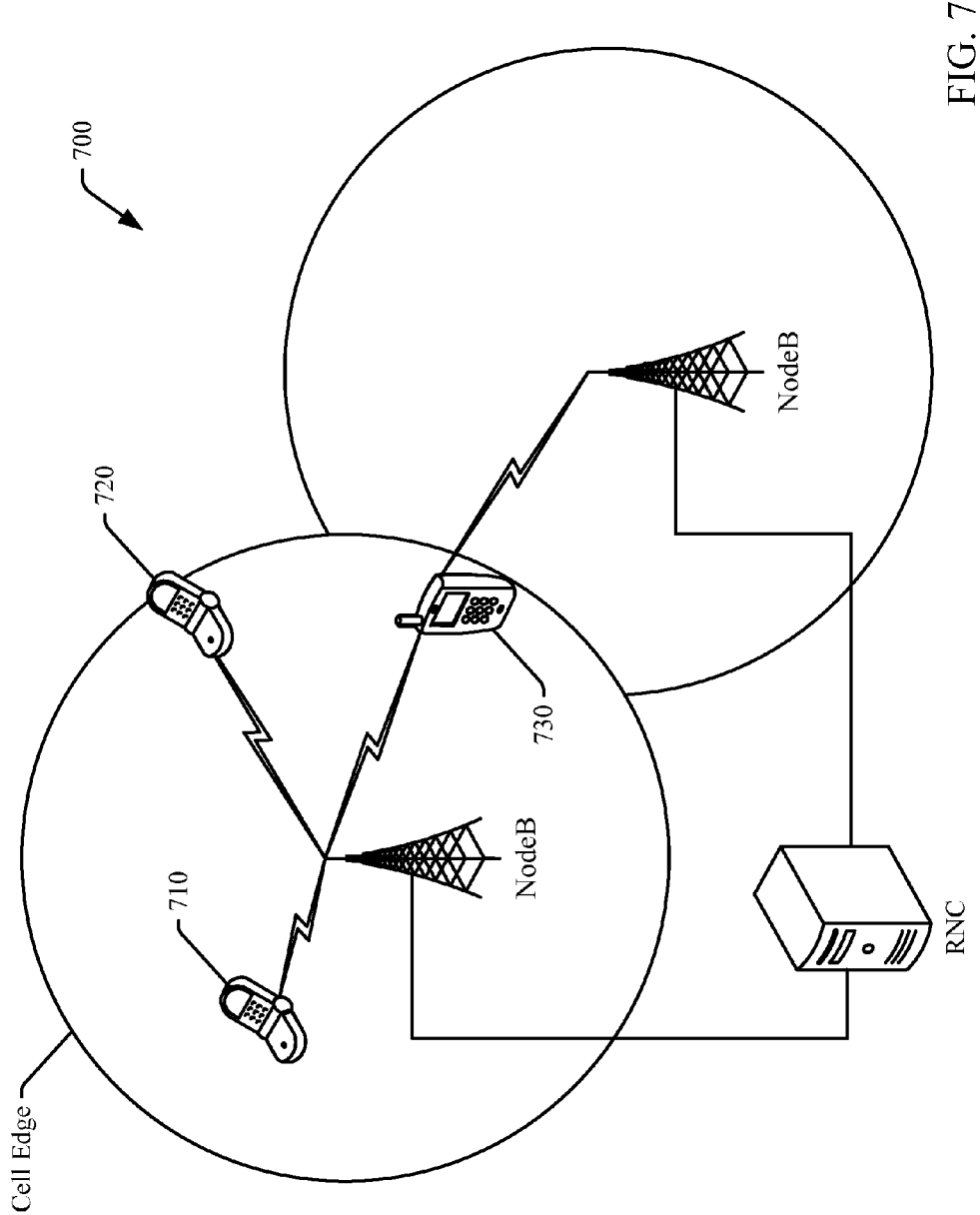
FIG. 7 illustrates a depiction of elements in a communications system in accordance with an aspect of the disclosed subject matter.

Referring now to FIG. 7, illustrated is a diagram of a system 700 facilitating dynamic adjustment of TTI in accordance with an aspect of the disclosed subject matter. System 700 can comprise multiple base stations (NodeB). Each NodeB can be communicatively coupled to an RNC (in FIG. 7 the two NodeB are connected to a single RNC for simplicity of illustration, however the disclosed subject matter is not so limited). The RNC can dynamically adjust the TTI of each UE in system 700 independently. For example, cell phone 710 can be instructed to employ a 2 ms TTI when it is located near a NodeB and has good communications link conditions. Further, for example, cell phone 720 can be instructed to employ a 10 ms TTI because it can have poor communications link conditions due to being located near to the cell edge. Moreover, PDA 730 can be directed to transition from a 2 ms TTI to a 10 ms TTI as the PDA 730 approaches the cell edge, or when PDA 730 experiences soft-handoff conditions or is in a soft-handoff. As such, depending on the communications conditions experienced by PDA, the RNC can instruct the PDA 703 to dynamically adjust its TTI to maintain a satisfactory closed link. As discussed at length herein, the disclosed subject matter is not limited to TTIs of 2 ms and 10 ms, but rather can employ TTIs of any duration where germane to the communications system.

Figure 8:
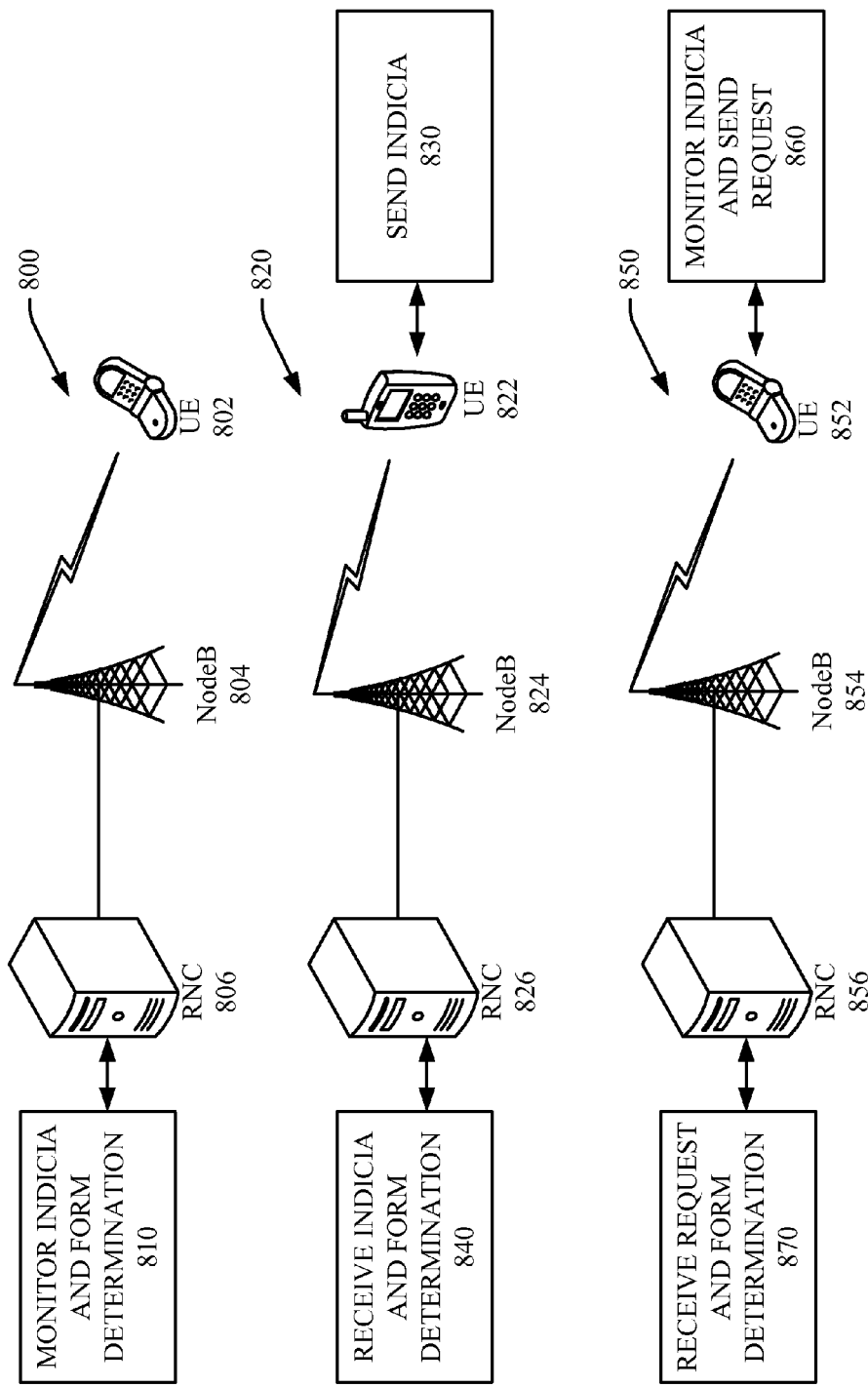
FIG. 8 illustrates a comparative depiction of non-limiting exemplary dynamic TTI adjustment techniques in accordance with an aspect of the disclosed subject matter.

Referring now to FIG. 8, illustrated are diagrams of systems 800, 820, 850 to facilitate dynamic adjustment of TTI in accordance with aspects of the disclosed subject matter. System 800 can comprise one or more UEs 802, one or more NodeBs 804, and one or more RNCs 806. The UEs 802 can be communicatively coupled to the NodeBs 804 by a wireless connection. Information can be communicated from the UEs 802 to the RNCs 806 by way of the NodeBs 804. In one embodiment of the disclosed subject matter, this information can include both communication information/data (e.g., an information payload, VoIP packets, voice information, application data, . . . ) and communication link information (e.g., Ecp/Nt, PER, quality of service data, . . . ).

The RNCs 806 can monitor 810 the information communicated to it by way of the NodeBs 804. Monitoring by the RNCs 806 can be done in a continuous, synchronous, or asynchronous manner. Where the monitoring is done in a continuous manner, the monitored information can be continually updated to facilitate forming a determination 810 related to indicia relating to dynamically adjusting TTI. Similarly, in synchronous monitoring 810, the indicia can be monitored on a predetermined regular schedule such that the monitored information is updated at regular intervals to facilitate forming a determination 810 related to indicia relating to dynamically adjusting TTI. Additionally, asynchronous monitoring 810 can be employed to update monitoring information at irregular intervals, such as, but not limited to, when a call is initiated, when a soft handoff occurs, when a particular level of data throughput occurs, when total traffic through the RNC 806 from multiple UEs 802 occurs, during specific periods of the day (e.g., high call volume periods, . . . ), or combinations thereof among others.

The indicia monitored at 810 can be employed in determining when dynamic adjustment of TTI is appropriate. Generally speaking, system 800 employs the RNC 806 to monitor and determine 810 when a dynamic adjustment of TTI should occur without placing substantial additional burden on either the NodeB 804 or the UEs 802 in the system 800. Where a determination is made at 810 that a dynamic TTI adjustment is appropriate, the RNC 806 can initiate the dynamic TTI adjustment by instructing the UE 802 to change from a first TTI to a second TTI.

System 800 further supports assigning a TTI to each UE 802 depending on communications link conditions. Thus, system 800 can monitor indicia and determine 810 employing an initial TTI (e.g., when a communication link is formed, the RNC 806 of system 800 can instruct UE 802 to begin with the most appropriate TTI, such as a 2 ms TTI or a 10 ms TTI). For example, the link budget requirements of each UE 802 in system 800 can be employed in monitoring and determining 810 assignment of a TTI. Thus UEs 802 at the cell edge, for example, having insufficient transmit power can be assigned 10 ms TTI by the RNC 806. Moreover, other UEs 802 can be assigned 2 ms TTI where the respective communications link conditions are sufficient to support 2 ms TTI. This can result in a fully supported mixed TTI system, as herein disclosed.

In one example in accordance with the disclosed subject matter, system 800 can facilitate the RNC 806 monitoring indicia, such as, the Ecp/Nt setpoint and packet error rate (PER) of each UE 802. In this example, if RNC 806 detects that a UE 802 is currently using 2 ms TTI and the Ecp/Nt setpoint has passed a certain threshold and/or the communication link PER over a certain time interval is beyond acceptable limit, then the RNC 806 can determine that UE 802 can have limited TX power headroom and can be unable to maintain closing the communications uplink (e.g., the call is in danger of being dropped). In response, the RNC 806 can send a reconfiguration message to UE 802 (by way of NodeB 804) instructing the UE 802 to transition to a 10 ms TTI from the 2 ms TTI to facilitate continued communication (e.g., a dynamic adjustment of the TTI). This non-limiting exemplary system 800 would not require any standards change under the 3GPP rel. 6 or rel. 7 standards (HSUPA or HSPA+ respectively).

The RNC 806 can determine an optimum TTI for each UE 802 of system 800. Optimum TTIs can be based on numerous system factors including, but not limited to, overall system 800 performance, highest data transfer rates, lowest overall power consumption, alignment of system 800 usage with business goals, etc. Being able to dynamically adjust the TTI can empower system administrators to base the dynamic TTI adjustments on a nearly limitless number of predetermined optimum operating conditions, and all such conditions are to be considered within the scope of the disclosed subject matter. For example, RNC 806 can monitor the Ecp/Nt setpoint and packet error rate (PER) of each UE 802. Where the RNC 806 detects that a UE 802 is currently using 10 ms TTI and its Ecp/Nt setpoint is below a certain threshold and its PER is within an acceptable limit, the RNC can send a reconfiguration message to the UE 802, requesting the UE 802 to transition from the 10 ms TTI to a 2 ms TTI to facilitate more efficient use of system 800 resources during the continued communication link.

Returning to FIG. 8, system 820 can comprise one or more UEs 822, one or more NodeBs 824, and one or more RNCs 826. The UEs 822 can be communicatively coupled to the NodeBs 824 by a wireless connection. Information can be communicated from the UEs 822 to the RNCs 826 by way of the NodeBs 824. In an embodiment of the disclosed subject matter, this information can include both communication information/data (e.g., an information payload, VoIP packets, voice information, application data, . . . ). Further, the UEs 822 can collect and send specific indicia 830 through the communication channel to RNC 826 by way of NodeB 824. These indicia can comprise communication link information (e.g., Ecp/Nt, PER, quality of service data, TX power headroom information, . . . ). RNC 826 can receive the indicia and form a determination 840 relating to dynamically adjusting TTI. Thus, system 820 can function similar to system 800 except that system 820 can include communicating link information available to the UE 822 (e.g., link information not directly available to the RNC 826) to improve the determinations formed at 840 over the determination formed at 810. In general, system 820 can provide more information into a determination process relating to dynamically adjusting TTI.

Thus, where an RNC 826 does not have direct access to select communications link information (e.g., a UE's 822 TX power headroom, . . . ), the RNC 826 can be required to determine these indicia based on other indicia (e.g., similar to system 800). However, by communicating this information (e.g., sending indicia 830) to the RNC 826 from UE 822, the indicia can be directly relied on rather than inferred or determined. The additional indicia can be sent 830, for example, in scheduled transmission operations by way of scheduling information (SI) messages passed to the RNC 826 through NodeB 824. Information passed to RNC 826 can facilitate determinations 840 made by the RNC 826. System 820 therefore can improve the reliability of the determinations relating to dynamic adjustment of TTI (indicia accessible to the UE 822 but not directly available to the RNC 826 can be specifically communicated to RNC 826). However, system 820 can require a change in current standards to incorporate gathering and communicating these additional indicia rather than relying on the RNC 826 to infer these indicia based on other monitored indicia already available to the RNC 826.

Again returning to FIG. 8, system 850 can comprise one or more UEs 852, one or more NodeBs 854, and one or more RNCs 856. The UEs 852 can be communicatively coupled to the NodeBs 854 by a wireless connection. Information can be communicated from the UEs 852 to the RNCs 856 by way of the NodeBs 854. In an embodiment of the disclosed subject matter, this information can include both communication information/data (e.g., an information payload, VoIP packets, voice information, application data, . . . ). Further, the UEs 822 can monitor and determine when a dynamic adjustment of TTI would be beneficial and can send a request 860 to the RNC 856 to initiate the dynamic TTI adjustment. RNC 856 can receive the request and form a determination 870 relating to dynamically adjusting TTI. Thus, system 870 can function similar to system 800 except that system 850 can shift monitoring indicia and aspects of determining the appropriateness of dynamic TTI adjustment to the UEs 852. In general, system 820 can preprocess communications link information at the UE 852 and determine the need to dynamically adjust TTI (e.g., from the perspective of the UE 852), such that a request to dynamically adjust the TTI for UE 852 can be provided to the RNC 856 where the request can be included in a determination of the appropriateness of dynamically adjusting the TTI for the requesting UE 852.

UE 852 can have knowledge of indicia relative to the UE 852 that can be employed in forming a determination relating to dynamic adjustment of the TTI for UE 852. For example, the indicia can be UE 852 TX power headroom limitation and UE 852 HARQ early termination statistics. Based on these locally relevant indicia, UE 852 can send a request to the RNC 856 to dynamically adjust the UE 852 TTI. The request can be processed by the RNC 856 in light of other indicia not local to UE 852 (e.g., system resources, business goals, complex analytics, . . . ) and form a determination at 870 relating to dynamically adjusting the UE 852 TTI in response to the request. For example, if the available TX power headroom for UE 852 goes below a certain threshold, UE 852 can request, for example by sending a layer 3 message, that RNC 856 switch UE 852 from a 2 ms TTI to a 10 ms TTI. Monitoring 860 indicia at the UE 852 can further facilitate monitoring indicia in real time, for example, monitoring the change (i.e., slope) in the remaining UE 852 TX power headroom which can facilitate proactively generating a request for dynamic TTI adjustment (e.g., requesting dynamic TTI adjustment before UE 852 actually runs out of TX power headroom). The RNC can then combine this request UE 852 with additional indicia (e.g., Ecp/Nt setpoint, PER, . . . ) and can make the final decision to initiate dynamically adjusting UE 852 TTI, if deemed appropriate. System 850 can give the best performance (as compared to system 800 and 820) however it can require standards changes (e.g., the specific UE 852 algorithms would need to be specified and new layer 3 messaging would need to be identified between UE 852 and RNC 856 by way of NodeB 854).

Figure 9:
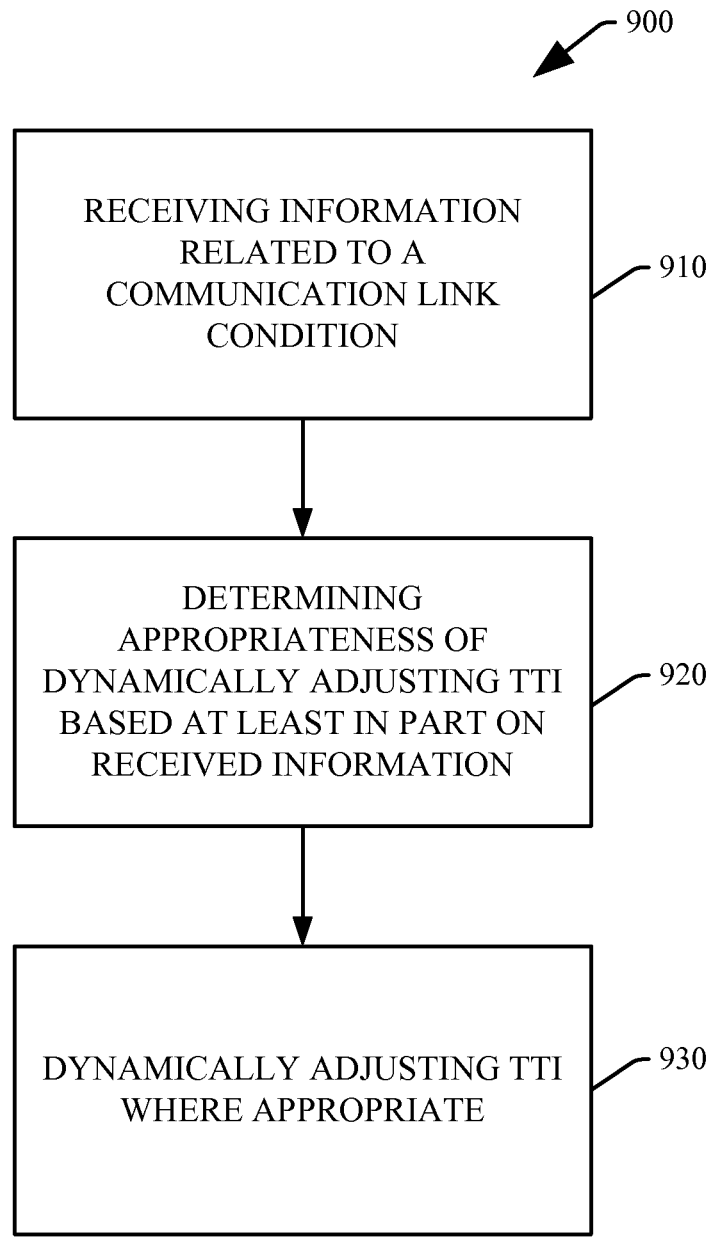
FIG. 9 illustrates a method to facilitate dynamic adjustment of TTI in accordance with an aspect of the disclosed subject matter.

Referring now to FIG. 9, illustrated is a methodology 900 facilitating dynamic adjustment of TTI in accordance with an aspect of the disclosed subject matter. At 910, information can be received relating to a communication link condition. This information can include indicia relating to the uplink portion of the communication link. Indicia can include, for example, the packet error rate, pilot channel signal to noise ratio, TX power headroom information, or combinations thereof among other indicia related to the communication link. These indicia can correlate to the quality of the communications link. For example, where there is a higher than acceptable packet error rate, there can be insufficient power to transmit data packets from a UE to a NodeB. As a second example, where the pilot channel signal to noise ratio is above a threshold, there can be an excessive number of UEs transmitting at a sufficiently high TX power to cause substantial interference. One of skill in the art will appreciate that numerous other indicia can be related to the condition of the communications link and that all such indicia are within the scope of the disclosed subject matter as they relate to determining the appropriateness of dynamic adjustment of TTI windows.

At 920, the received information can be included in forming a determination of the appropriateness of dynamically adjusting TTI with a communications system. By dynamically adjusting TTI, the TTI can be changed within an established communication link to maintain or improve the performance of that communications link. For example, where a 2 ms TTI is being employed, and received indicia indicate an excessively high PER, a determination can be formed that changing to a 10 ms TTI can improve the performance of the communications link and therefore is appropriate.

At 930, the TTI can be dynamically adjusted in accordance with the determination of appropriateness. Where for example, it is determined that switching form a 2 ms TTI to a 10 ms TTI is appropriate to maintain the established communications link, a RNC can instruct a UE to adjust the TTI from 2 ms to 10 ms. At this point, methodology 900 can end.

In addition to dynamically adjusting TTI within an established communications link, methodology 900 can also facilitate dynamically adjusting TTI when a communications link is established. For example, when a cell phone call is initiated, an RNC can receive information relating to the condition of the potential communications link (910) such that a determination of the most appropriate TTI can be formed (920) and the UE can be instructed to close the link with the appropriate TTI (930). Thus, for example, where a cell phone at the cell edge initiates call, a low Ecp/Nt can indicate that a 10 ms TTI can be the most appropriate TTI to employ and the UE can be instructed to establish the call with the 10 ms TTI. Similarly, other UEs in the cell can individually be instructed to employ appropriate TTIs (e.g., a mixed TTI cell can be established).

Moreover, TTI can be dynamically adjusted based on additional criteria in combination with the communication link condition indicia. For example, where a UE has a sufficiently good communications link condition to maintain a 2 ms TTI but is entering a soft handoff to a second NodeB, the RNC can, for example, instruct the UE to default to a 10 ms TTI to facilitate the soft handoff. Alternatively, where the second NodeB communications link conditions indicia indicates that the soft handoff can be completed with a 2 ms TTI, the UE can be instructed by the RNC to maintain the 2 ms TTI throughout the soft handoff. As disclosed herein, dynamic adjustment of the TTI is not limited to 2 ms and 10 ms TTI, and one of skill in the art will appreciate that all TTI times are within the scope of the disclosed subject matter where those TTI comport with established standards or specific applications.

Figure 10:
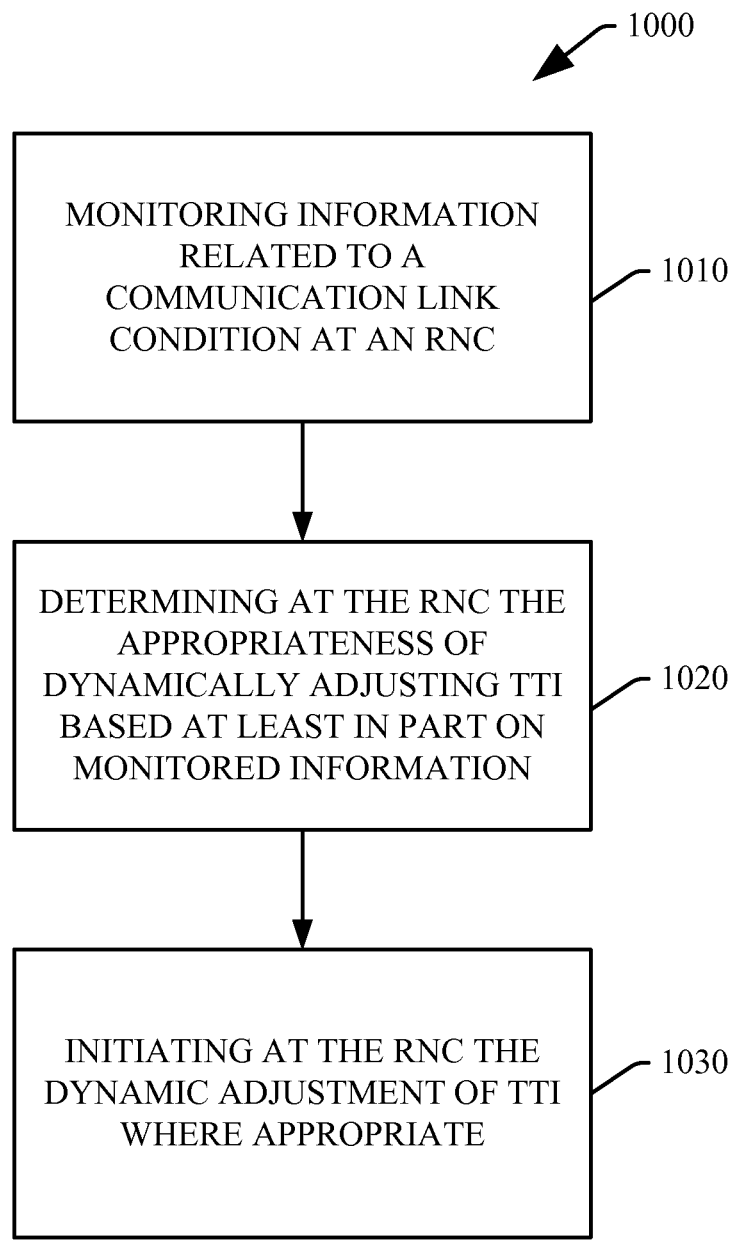
FIG. 10 illustrates a method to facilitate dynamic adjustment of TTI in accordance with an aspect of the disclosed subject matter.

Referring now to FIG. 10, illustrated is a methodology 1000 facilitating dynamic adjustment of TTI in accordance with an aspect of the disclosed subject matter. At 1010, information related to a communication link condition can be monitored at an RNC. The indicia available to the RNC for monitoring can be combined to form determinations about likely communications link conditions. For example, where the PER rises above a threshold and elevating the Ecp/Nt does not correct the rising PER, a determination can be made that it is likely the UE has limited TX power headroom and the communications link is not likely to improve. One of skill in the art will appreciate that a nearly limitless number of other determinations can be made about communications system characteristics based on the indicia monitored by the RNC and that all such indicia and determinations related thereto are within the scope of the disclosed subject matter.

At 1020, the RNC can determine the appropriateness of dynamically adjusting the TTI based at least in part on the information monitored. Where, for example, it has been determined that the communications link is not likely to improve based on the monitored Ecp/Nt and PER, the RNC can determine that it can be appropriate to dynamically adjust the TTI to improve and maintain the established communication link. At 1030, the RNC can initiate dynamic TTI adjustment in accord with the determination. For example, where it has been determined that it is likely that a UE is TX power headroom limited and a 2 ms TTI is employed, the RNC can instruct the UE to dynamically adjust to a 10 ms TTI to facilitate improved communication over the link. At this point methodology 1000 can end. Methodology 1000 can comply with current industry standards (e.g., 3GPP rel. 6&7).

Figure 11:
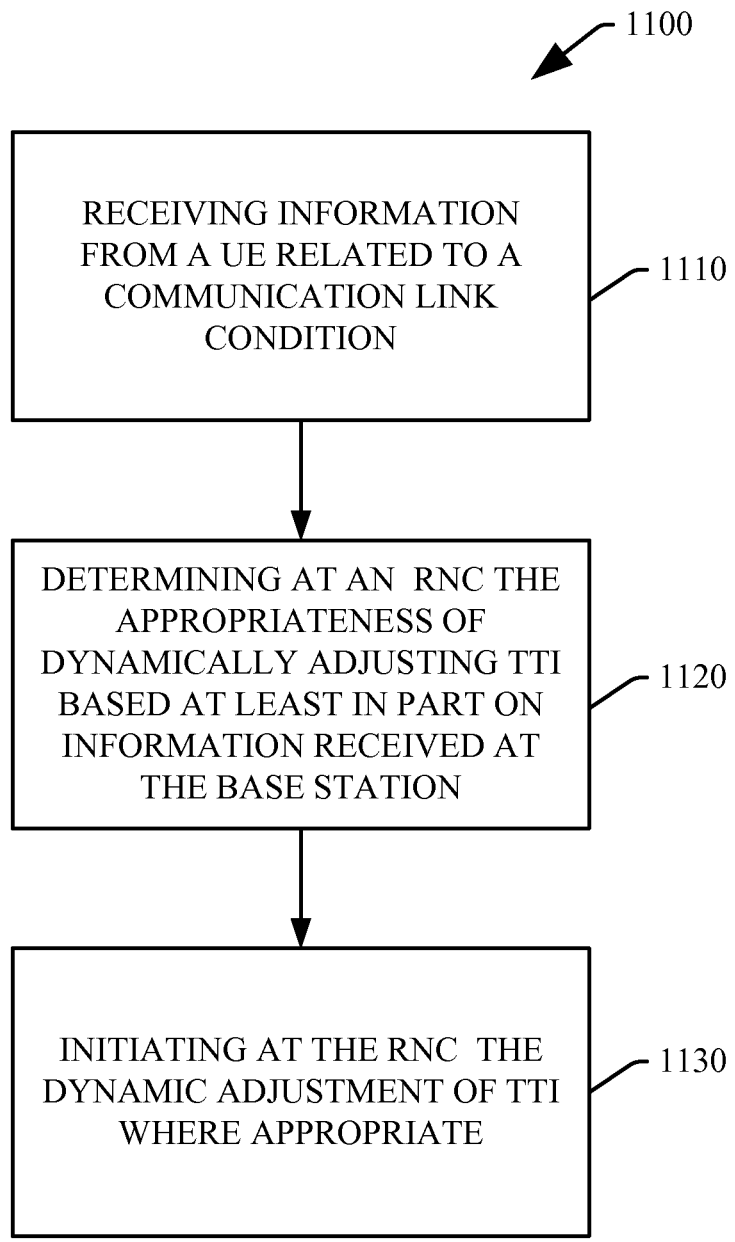
FIG. 11 illustrates a method to facilitate dynamic adjustment of TTI in accordance with an aspect of the disclosed subject matter.

Referring now to FIG. 11, illustrated is a methodology 1100 facilitating dynamic adjustment of TTI in accordance with an aspect of the disclosed subject matter. At 1110, communication link condition information available to a UE can be received. This information can be information not directly available for monitoring by an RNC. For example, an RNC can infer the available TX power headroom available for UE based on other indicia as herein disclosed, however this same information can be directly available to the UE itself Thus, the UE can communicate these indicia, for example, to a NodeB which can forward the information on to the RNC.

At 1120, the RNC can determine the appropriateness of dynamically adjusting the TTI based at least in part on the UE information received. For example, where the available UE TX power headroom information is received by the RNC, indicating that there is insufficient headroom remaining, he RNC can determine that dynamically adjusting the TTI is appropriate. At 1130, the RNC can initiate dynamic adjustment of the TTI where appropriate. Thus, for example, where the determination has been made that it is appropriate to adjust the TTI, the RNC can instruct the UE to adjust the TTI. At his point methodology 1100 can end.

In general, methodology 1100 allows additional information to be communicated to the RNC to facilitate improved determinations related to dynamically adjusting TTI. As compared to methodology 800, where the RNC can be required to form determinations on the likelihood of a condition existing (e.g., inferences) where the RNC cannot directly monitor indicia of the condition, methodology 1100 permits gathering of these additional indicia and communication of them to the RNC for improved dynamic adjustment of TTI. Methodology 1100 may not comply with current industry standards (e.g., 3GPP rel. 6&7), though the additional benefits can be an impetus for modification of the standards to incorporate the additional messaging capacity to communicate the UE available information to the RNC to facilitate improved determinations relating to dynamic TTI adjustment.

Figure 12:
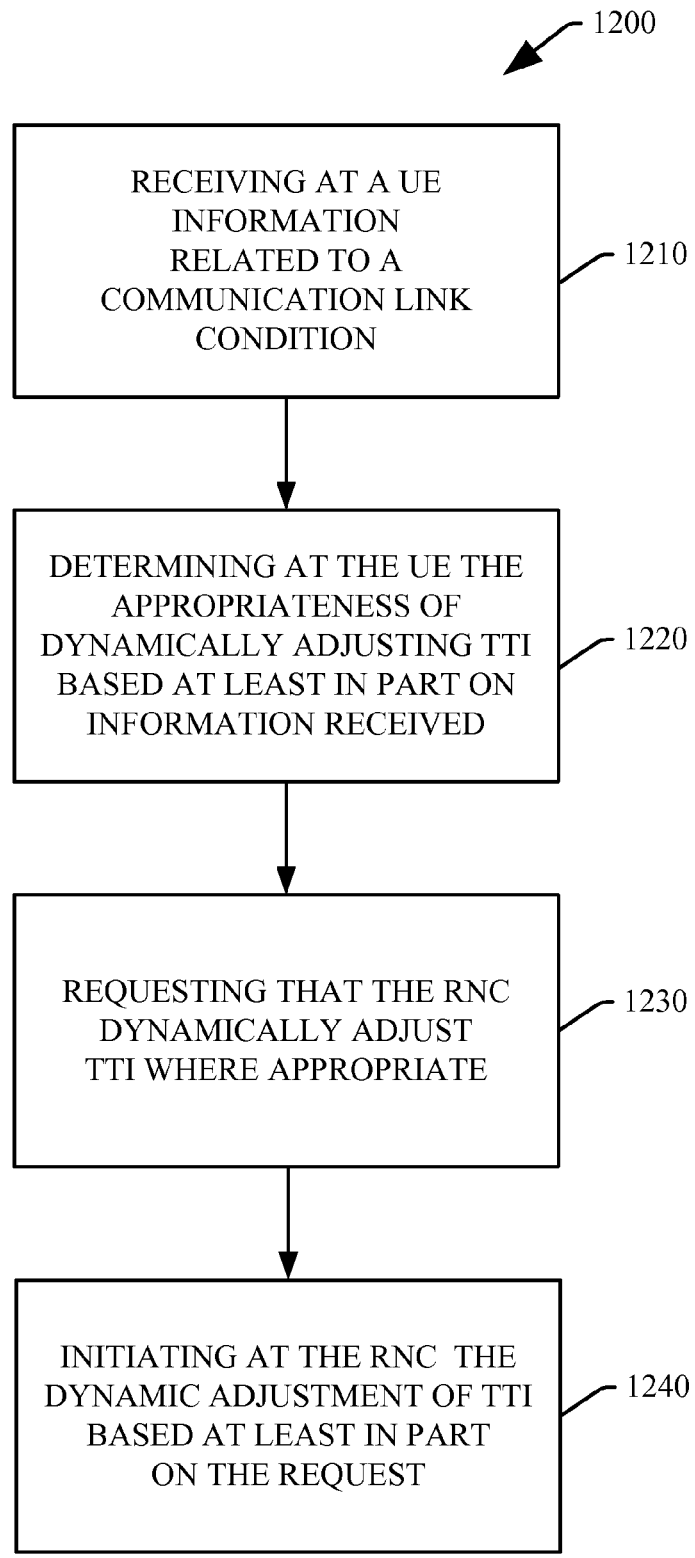
FIG. 12 illustrates a method to facilitate dynamic adjustment of TTI in accordance with an aspect of the disclosed subject matter.

Referring now to FIG. 12, illustrated is a methodology 1200 facilitating dynamic adjustment of TTI in accordance with an aspect of the disclosed subject matter. At 1210, a UE can receive information related to communication link conditions. At 1220 the UE can determine the appropriateness of dynamically adjusting the TTI for that UE based at least in part on the information received by the UE. At 1230, the localized determination of appropriateness can cause a request for dynamic TTI adjustment to be sent to the RNC. Thus, each UE in a communications system can self monitor, determine when a TTI adjustment is needed, and initiate a request for dynamic TTI adjustment based on the local communications link conditions. For example, where a UE is self monitoring an increasing Ecp/Nt setpoint (e.g., 1210), the UE can determine that it will soon need to adjust the TTI to maintain the established link (e.g., 1220), and in response to this determination can request that the RNC dynamically adjust the TTI (e.g., 1230).

At 1240, the RNC can initiate a dynamic TTI adjustment based at least in part on the UE request. Thus, while each UE can request TTI adjustment, the RNC can make a final determination, based on other factors in addition to the request, as to the appropriateness of dynamically adjusting the TTI. Where for example, a UE requests a TTI adjustment, the RNC can determine that the TTI adjustment is not appropriate where the overall communications system performance could be negatively affected by the dynamic TTI adjustment and in response can refuse to initiate the dynamic TTI adjustment. At this point Methodology 1200 can end.

Methodology 1200, in general, distributes aspects of determining the appropriateness of dynamic TTI adjustment among the different elements of a communications network. This can allow UEs in a communications system to form local determinations based on communications link conditions that are locally relevant and available to the UE. This further takes computational loading off of the RNC and can reduce messaging and information traffic volume, related to passing the indicia used in forming the determinations, sent across the communications network from the UE to the RNC by way of the NodeBs. Where the determinations are formed local to the UEs only a request needs to be sent to the RNC as part of the RNC's determinations as to the appropriateness of the dynamic TTI adjustment. By centralizing the final determinations related to TTI adjustment, additional factors not local to the UEs can be considered with the final determination. After a final determination has been formed, a simple message back to the UE can instruct the UE to dynamically adjust the TTI. Methodology 1200 can be incompatible with current industry standards (e.g., 3GPP rel. 6&7), however, methodology 1200 can provide significant benefit in regard to dynamic TTI adjustment. One of skill in the art will appreciate that any future standards development can incorporate this distributed dynamic TTI adjustment methodology but that such features would be considered within the scope of the disclosed subject matter.

Further, those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. The processor and the storage medium may reside in an ASIC.

Further, in some aspects, the processor and the storage medium may reside in an ASIC. Additionally, the ASIC may reside in a user terminal In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product. The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for dynamically adjusting a transmission time interval in a communications system comprising:
    monitoring, at an at least one user equipment, at least one indicator related to at least one communication link condition;
    determining at the at least one user equipment, based at least in part on the at least one indicator, at least one local transmission time interval to facilitate communication over the at least one communication link;
    transmitting at least one request for an instruction to employ at least one transmission time interval equivalent to the at least one determined local transmission time interval, from the at least one user equipment to the radio network controller; and
    receiving, from the radio network controller, at least one instruction, for the at least one user equipment employing the at least one communication link, to employ at least one determined transmission time interval during at least one of an established communications event comprising a voice call, a data call, a soft-handoff condition, or any combination thereof, wherein the at least one determined transmission time interval is based on the at least one indicator.

2. The method of claim 1, wherein the at least one request for an instruction instructs the radio network controller to initiate a dynamic adjustment of the transmission time interval used in the at least one communication link in response to the at least one request for an instruction.

3. The method of claim 2, wherein the at least one request for an instruction requests a dynamically adjusted transmission time interval that is different than an immediately prior transmission time interval used in the at least one communication link.

4. The method of claim 3, wherein the requested dynamically adjusted transmission time interval is at least one of 2 ms or 10 ms.

5. The method of claim 1, wherein the at least one indicator related to the at least one communication link condition comprises at least one of a packet error rate, a pilot channel signal to noise ratio, or a transmission power headroom indicator.

6. The method of claim 1, wherein the determining at least one local transmission time interval is based at least in part on an analysis of the communication link condition related to information about a metric of the communication link condition crossing a threshold value.

7. The method of claim 6, wherein packet error rate is the metric and the threshold value is between about 0.1% and about 5% for a period between about one transmission time interval and about 1 second.

8. The method of claim 6, wherein analysis of the communications link condition further comprises analyzing information relating to a plurality of metrics further relating to a plurality of communication link conditions corresponding to respective ones of a plurality of user equipment, wherein the resulting determination of at least one appropriate TTI comprises a plurality of TTIs, and wherein each of the plurality of user equipment requests of the RNC a respective one of the plurality of determined TTIs based on the respective communication link condition.

9. The method of claim 8, wherein at least a first of the plurality of user equipment requests to employ a first transmission time interval and at least a second of the plurality of user equipment requests to employ a second transmission time interval that is different than the first transmission time interval.

10. The method of claim 1, wherein the determining at least one local transmission time interval, is related to optimizing data throughput in relation to the communication link condition.

11. A computer-readable medium storing computer executable code, comprising:
    a first set of codes for causing a computer to monitor, at an at least one user equipment, at least one indicator related to at least one communication link condition;
    a second set of codes for causing the computer to determine at the at least one user equipment, based at least in part on the at least one indicator, at least one local transmission time interval to facilitate communication over the at least one communication link;
    a third set of codes for causing the computer to transmit at least one request for an instruction to employ at least one transmission time interval equivalent to the at least one determined local transmission time interval, from the at least one user equipment to the radio network controller; and
    a fourth set of codes for causing the computer to communicate, from the radio network controller, at least one instruction, for the at least one user equipment employing the at least one communication link, to employ at least one determined transmission time interval during at least one of an established communications event comprising a voice call, a data call, a soft-handoff condition, or any combination thereof, wherein the at least one determined transmission time interval is based on the at least one indicator.

12. An apparatus, comprising:
means for monitoring, at an at least one user equipment, at least one indicator related to at least one communication link condition;
means for determining at the at least one user equipment, based at least in part on the at least one indicator, at least one local transmission time interval to facilitate communication over the at least one communication link;
means for transmitting at least one request for an instruction to employ at least one transmission time interval equivalent to the at least one determined local transmission time interval, from the at least one user equipment to the radio network controller; and
means for communicating, from the radio network controller, at least one instruction, for the at least one user equipment employing the at least one communication link, to employ at least one determined transmission time interval during at least one of an established communications event comprising a voice call, a data call, a soft-handoff condition, or any combination thereof, wherein the at least one determined transmission time interval is based on the at least one indicator.

13. A user equipment (UE), comprising:
a memory comprising a UE based TTI request component module having a communications condition analyzer component, a local TTI selection logic component, and a local TTI request generator component;
a processor in communication with the memory and operable to form a TTI window request instruction based at least in part on TTI window information;
wherein the communications condition analyzer component is operable to analyze the communication condition between an RNC and the UE based at least in part on communications condition information available to the UE;
wherein the local TTI selection logic component is operable to determine at least one appropriate TTI window based at least in part on the analysis of the communications condition;
wherein the input/output component can at least receive incoming information related to communication conditions and communicate said communication condition information to the communications condition analyzer, and further can at least receive the determined TTI window information from the TTI selection logic component and communicate said TTI window information to the processor;
a communications module in communication with the memory and the processor and operable to receive a transmission relating to communications condition indicia available to the UE;
wherein the TTI determination component module is operable to generate at least one request instruction relating to dynamically adjusting a TTI window between the RNC and the UE during at least one of an established communications event, a voice call, a data call, a soft-handoff condition, or any combination thereof; and
wherein the communications module is further operable to receive the dynamically adjusted TTI window request instruction and communicate said request instruction to at least the RNC.

14. The UE of claim 13, wherein a TTI window request instruction instructs an RNC in communication with the UE over a communication link to initiate a dynamic adjustment of the TTI used in the established communication link in response to the TTI window request instruction.

15. The UE of claim 14, wherein the TTI window request instruction requests a dynamically adjusted TTI that is different than an immediately prior TTI used in the established communication link.

16. The UE of claim 14, wherein the requested dynamically adjusted TTI is at least one of 2 ms or 10 ms.

17. The UE of claim 13, wherein the information related to communication condition and available to the UE comprises at least one of a packet error rate, a pilot channel signal to noise ratio, or a transmission power headroom indicator.

18. The UE of claim 13, wherein the determination of at least one appropriate TTI window based at least in part on the analysis of the communications condition, is related to information about a metric of the communications condition crossing a threshold value.

19. The UE of claim 18, wherein packet error rate is the metric and the threshold value is between about 0.1% and about 5% for a period between about one transmission time interval and about 1 second.

20. The UE of claim 13, wherein analysis of the communications condition further comprises analyzing information relating to a plurality of metrics further relating to a plurality of communication link conditions corresponding to respective ones of a plurality of user equipment, wherein the resulting determination of at least one appropriate TTI comprises a plurality of TTIs, and wherein each of the plurality of user equipment is requests of the RNC a respective one of the plurality of determined TTIs based on the respective communication link condition.

21. The UE of claim 20, wherein at least a first of the plurality of user equipment is requests to employ a first transmission time interval and at least a second of the plurality of user equipment requests to employ a second transmission time interval that is different than the first transmission time interval.

22. The UE of claim 13, wherein the determination of at least one appropriate TTI window based at least in part on the analysis of the communications condition, is related to optimizing data throughput in relation to the communication link condition.

* * * * *